(No Model.) 3 Sheets—Sheet 1.
G. WESTINGHOUSE, Jr.
CONDUIT ELECTRIC RAILWAY.
No. 497,394. Patented May 16, 1893.
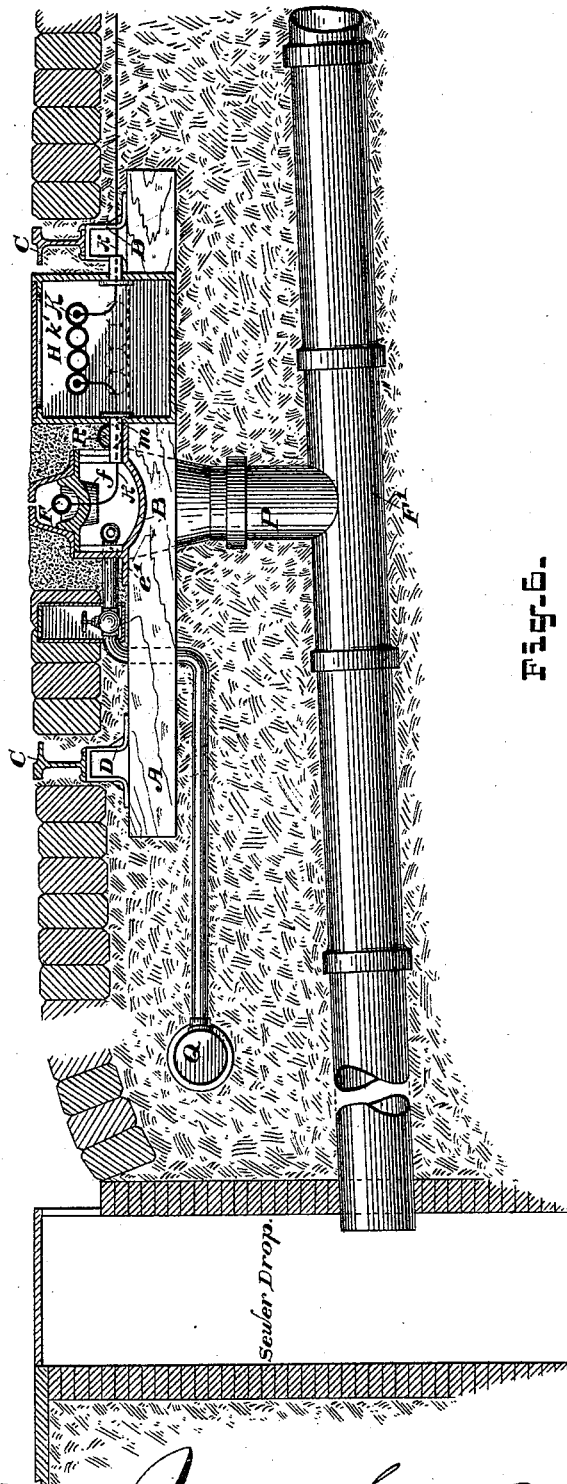
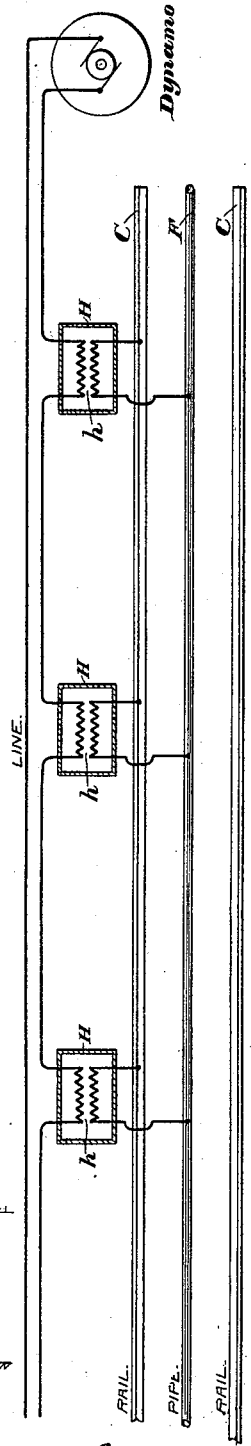

(No Model.) 3 Sheets—Sheet 2.
G. WESTINGHOUSE, Jr.
CONDUIT ELECTRIC RAILWAY.
No. 497,394. Patented May 16, 1893.
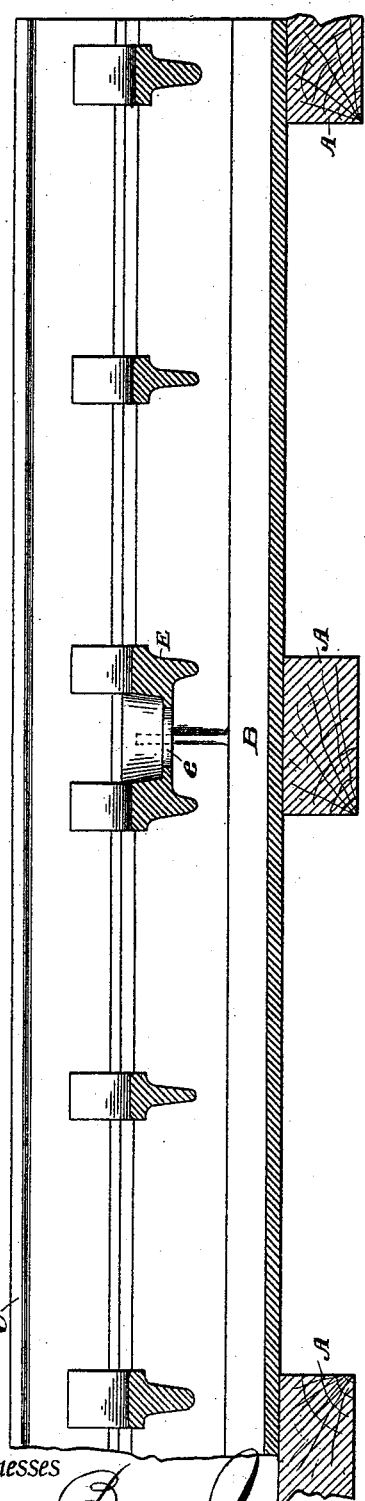
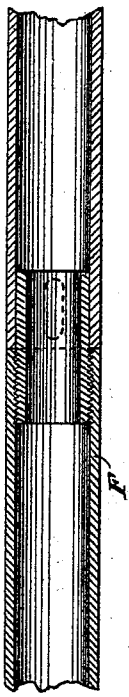
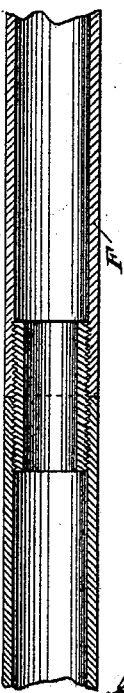

(No Model.) 3 Sheets—Sheet 3.
G. WESTINGHOUSE, Jr.
CONDUIT ELECTRIC RAILWAY.
No. 497,394. Patented May 16, 1893.
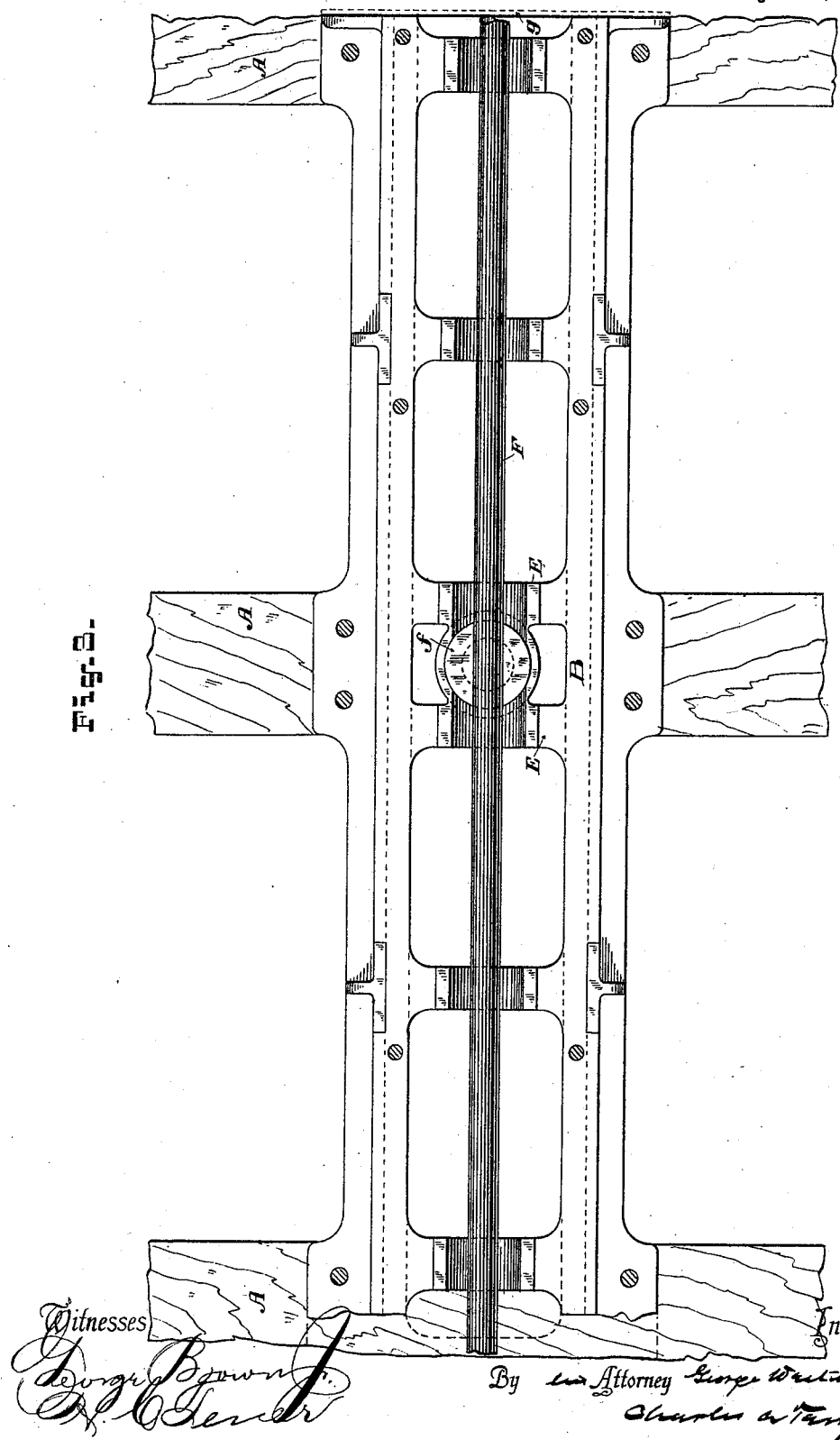

UNITED STATES PATENT OFFICE.

GEORGE WESTINGHOUSE, JR., OF PITTSBURG, PENNSYLVANIA.

CONDUIT ELECTRIC RAILWAY.

SPECIFICATION forming part of Letters Patent No. 497,394, dated May 16, 1893.

Application filed April 8, 1892. Serial No. 428,315. (No model.)

*To all whom it may concern:*

Be it known that I, GEORGE WESTINGHOUSE, Jr., a citizen of the United States, residing in Pittsburg, in the county of Allegheny and State of Pennsylvania, have invented new and useful Improvements in Systems of Circuits and Conductors for Electric Railways, (Case No. 492,) of which the following is a specification.
The invention relates to a system of circuits and apparatus for supplying electric currents to electric railway motors, and particularly to the construction of underground conduits for containing the conductors and other such apparatus as may be necessary for the purpose.

Heretofore although numerous forms of conduits have been proposed, yet practically electric railways are operated in almost every instance by currents transmitted thereto through overhead conductors. Among the objections found to the forms of conduits heretofore proposed have been the large cost incident to the construction, and the difficulty of maintaining the required insulation of the conductors, and keeping the conduits free from obstructions.

My invention aims to overcome these and other difficulties heretofore experienced, and in general terms it may be described as follows: The conduit is constructed with a slot through which electrical connections are made with the conductor contained therein. This conductor is supported upon glass blocks or other suitable insulators resting in a longitudinal horizontal wall or partition. The conduit is usually formed of four parts: first, a cast iron trough with suitable flanges for supporting it upon the ties of the track; second, a cover extending across the upper part of this box and resting upon suitable braces or columns, and having openings for permitting water and dirt to escape, and also suitable sockets for receiving the conductor insulators; and finally, two rails which rest upon the top of the cover and trough and are bolted, or otherwise fastened, thereto. These rails form the sides of the upper portion of the conduit and close it in except for the narrow slot through which the conductor is reached. The cover and box and rails are all firmly held together in a single structure by bolts. On the cover of the trough between the slot rails are placed suitable braces which preserve a proper predetermined distance between the slot rails. The entire depth of the conduit may be such that it may rest upon the track ties. In practice twelve inches is a convenient depth. The box or trough and its cover and the slot rails are made in sections of about twelve feet in length, and narrow spaces may be left between adjacent boxes and slot rails, so that there may be no electrical connection from section to section. This insulation of the sections of the conduit itself forms an important feature of the invention in certain of its uses.

The electrical conductor may be divided into sections of several hundred feet, and each of these sections may be made in the form of a pipe or a rod of wrought iron or other suitable material, the diameter of which will be determined by the circumstances. The pipes or rods constituting this conductor are joined together by screw plugs fitting within the interior of the pipe, the joints being tinned or soldered, or they may be otherwise fastened to insure good electrical connections. In order to permit of expansion incident to changes of temperature, the conductor sections are usually fastened to a portion only of the insulators, for instance, those near the center of each section of the conduit, the balance of the conductor resting usually unfastened upon the insulators, they being suitably grooved for holding it in the proper position. If desired the various sections of the conductor may be joined by slip joints, which will permit the ends of the pipe to slide to and fro with changes of temperature.

To effectively guard against the leakage of current, the troughs or boxes and the rails may be coated with any usual well known substance ordinarily employed for coating cast iron water pipes, such for instance, as preparations of tar or cementing compounds.

For the purpose of collecting the current from the conductor suitable contact wheels or brushes are carried by an arm extending through the slot, or a number of bars arranged in suitable holders and bent into a form to fit around the conductor may be employed. It is advantageous to have them so constructed that a spring pressure will be exerted to insure good electrical contact. The arm or carrier for supporting the brush or collector may be a thin plate of about one-eighth of an inch in thickness, so that it will run freely along the slot. Provision may be made for lateral and vertical motion with reference to the car, so that the brush or collector will adjust itself always so as to be in contact with the conductor.

In practice I have found that the leakage from a section of conduit to the track rails or the earth will be very slight, and therefore there is no special need for insulating the sides of the arm or support which carries the contact brushes as it may be allowed to touch the edges of the slot without causing sufficient leakage to be material. This is especially so because of the short length of the conduit sections. These lengths are usually such that a car will always cover the section which may be thus charged by contact between the collector and the adjacent slot rails, and as the successive slot rails are insulated from each other, there will be little or no leakage from one section to another.

In order to keep the conduit free from dirt, flushing pipes may be arranged at suitable distances, so that water may be turned into the conduits at the highest points and the whole thoroughly cleaned out, connections being made at as many places as convenient between the conduit and ordinary sewers. To prevent the accumulation of sediment and to aid the water in flushing, a wire rope or rod may be laid in the conduit and adapted to be moved to and fro.

The supply conductor may be connected directly with the source of supply or in case alternating currents are employed converters may be located in suitable boxes placed along the lines of the road, and current delivered therefrom to the conductor.

In the accompanying drawings illustrating the invention Figure 1 is a cross-section of a road bed equipped with a conduit embodying the improvements. Fig. 2 is a longitudinal section. Fig. 3 is a plan. Figs. 4 and 5 illustrate details, and Fig. 6 illustrates the converter system.

Referring to the figures, A A represent the ties supporting the trough B, and C C represent the track rails supported from the ties A in any suitable manner, as for instance, upon chairs D. Upon the troughs B are placed covers E, which support the supply conductor F. Openings or sockets $e$ are formed in the covers E for the purpose of receiving insulators $f$, which support the conductor F. The portions of the cover between the sockets are more or less open, leaving braces or columns $e'$ for strength. These insulators may be of glass, porcelain, or other suitable material. The conduit as described is internally braced by the plate E against the action of heavy weights passing over the slot rails and against the action of frost. This plate E may be made of cast steel or of rolled steel pressed to the required shape. They are constructed with depressions in their tops for receiving the conductor F. The conduit troughs and covers are constructed in sections as indicated, adjacent sections being separated from each other by narrow spaces $g$ which serve to partially insulate one section from another, so that current passing from the electric conductor, within the conduit to the section of conduit under the car is not sufficient to produce a material difference in the electromotive force between the main rails and the slot rails of the other sections. This will be sufficiently accomplished by the natural oxidation of the parts. At suitable intervals are placed connection boxes H into which there are led the main supply conductors K, and from which connections $k$ are led to the conductors F. For this purpose suitable openings are made as indicated at $m$ leading from the connection box to the trough B. Additional pipes may be laid as indicated at $k'$, for the purpose of carrying wire for electric light and power purposes, it being evident that the cost can in this manner be very considerably reduced if advantage is taken of the relaying of track.

For the purpose of draining the conduit and flushing it if desired, suitable sewer connections are made as indicated at P and the main water supply pipes Q laid along the roadway are arranged to be connected, provided with suitable connections and cocks, so that the water may be turned on and the troughs washed out.

The form of the conductor F which I usually prefer is tubular. This admits of ready jointing of sections and affords large contact surface. It may be made of iron or copper, or iron galvanized, or of iron with a coating of copper or of other suitable material, and should be rolled smooth. When rods are used, they are made with hollow screwed ends to receive a screwed connecting plug to join them firmly together, except at the slip joints where the rods or one of them are hollow with a smooth closely fitting plug to insure the same axial line for both sections.

To permit of expansion and contraction of the conductor, the ends may be coupled together by slotted couplings as indicated in the drawings, but this may not always be necessary. I usually prefer to fasten the conductor to only a portion of the insulating plugs or supports $f$; thus it may be fastened only at the central portion to those insulators contained in one section of conduit.

In the drawings I have shown a number of pipes laid along between the rail and the conduit and connected with junction-boxes, these pipes being intended for the use of the supply wires or high tension wires, if alternating currents are used.

In case it is desired to employ alternating electric currents for operating the motors, converters $h$ may be located in the boxes H, the electrical connections from the conductors $k$ then being formed with the primary of the converter, while the secondary is connected with the conductors F.

I claim as my invention—

1. A conduit for electric railway conductors, consisting of a trough, a cover therefor, and slot rails extending upward from the cover and constituting the sides of the upper portion of the conduit.

2. A conduit for electric conductors for electric railways consisting of a series of electrically separated covered boxes, insulators carried within the covers, and slot rails supported from the covers, substantially as described.

3. In a conduit for electric railway conductors, a closed trough constituting a support for the slot rails said trough being formed in insulated sections, insulators carried in the top of the trough, and draining openings in said top, substantially as described.

4. A conduit for electric railway conductors constructed with two longitudinal compartments, the one for drainage and the other for containing the conductor, formed of four parts, viz: a bottom trough, a cover spanning the drainage compartment and two slot rails, all secured together.

5. In a conduit for electric railway conductors, the combination of a trough, a cover having lugs or sockets for receiving insulators, slot rails secured to said cover, and forming the sides of the upper portion of the conduit, and insulators carried by the cover, and a continuous conductor resting in said insulators.

6. In a conduit for electric railways, a contact conductor consisting of metal tubes formed in sections and sleeves fitting within said tubes, serving as couplings for the same, said sleeves being adapted to slip into one of the abutting sections and being rigidly fastened to the other, substantially as described.

7. A contact conductor for electric railways, consisting of metal tubes formed in sections and sleeves fitting within said tubes serving as couplings for the same, and permitting of relative movement, substantially as described.

8. A contact conductor for electric railways, formed of sections having abutting ends, said ends being hollow at each joint, and a sleeve fitting within such ends, and adapted to slide in at least one of them, substantially as described.

In testimony whereof I have hereunto subscribed my name this 2d day of April, A. D. 1892.

GEO. WESTINGHOUSE, JR.

Witnesses:
 H. C. TENER,
 JAMES WM. SMITH.